(12) United States Patent
Chen et al.

(10) Patent No.: US 11,050,569 B2
(45) Date of Patent: Jun. 29, 2021

(54) SECURITY MEMORY SCHEME

(71) Applicant: MACRONIX INTERNATIONAL CO., LTD., Hsinchu (TW)

(72) Inventors: Chia-Jung Chen, Zhubei (TW); Chin-Hung Chang, Tainan (TW); Kuen-Long Chang, Taipei (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 82 days.

(21) Appl. No.: 16/541,009

(22) Filed: Aug. 14, 2019

(65) Prior Publication Data
US 2021/0051020 A1    Feb. 18, 2021

(51) Int. Cl.
*H04L 29/06* (2006.01)
*H04L 9/32* (2006.01)
*G06F 3/06* (2006.01)

(52) U.S. Cl.
CPC .......... *H04L 9/3242* (2013.01); *G06F 3/0622* (2013.01); *G06F 3/0659* (2013.01); *G06F 3/0679* (2013.01); *H04L 9/3263* (2013.01)

(58) Field of Classification Search
CPC ... H04L 9/3242; H04L 9/3263; H04L 3/0659; H04L 9/0679; H04L 9/0622
See application file for complete search history.

(56) References Cited

U.S. PATENT DOCUMENTS

| | | | | |
|---|---|---|---|---|
| 5,296,687 A | * | 3/1994 | Geronimi | G06Q 20/341 235/380 |
| 5,774,545 A | | 6/1998 | Raghavachari | |
| 5,991,519 A | * | 11/1999 | Benhammou | G06F 12/1441 726/3 |
| 6,026,016 A | * | 2/2000 | Gafken | G11C 16/22 365/185.04 |

(Continued)

FOREIGN PATENT DOCUMENTS

CA      2303348 A1 *   4/1999   ......... G06F 12/1441

OTHER PUBLICATIONS

Advanced Encryption Standard (AES) algorithm that is specified in Federal Information Processing Standard (FIPS) Pub. 197, Nov. 26, 2001, 51 pages.

(Continued)

*Primary Examiner* — Sher A Khan
(74) *Attorney, Agent, or Firm* — Haynes Beffel & Wolfeld LLP

(57) ABSTRACT

A memory device can include a memory, and an interface to receive a memory command sequence. A message authentication code MAC is provided with the command sequence. Control circuits on the device include a command decoder to decode a received command sequence and to execute an identified memory operation. A message authentication engine includes logic to compute a value of a message authentication code to be matched with the received message authentication code based on the received command (Continued)

sequence and a stored key. The device can store a plurality of keys associated with one or more memory zones in the memory. Logic on the device prevents completion of the memory operation identified by the command sequence if the value computed does not match the received message authentication code.

20 Claims, 4 Drawing Sheets

(56) References Cited

U.S. PATENT DOCUMENTS

| | | | | |
|---|---|---|---|---|
| 8,328,104 | B2* | 12/2012 | Chou | G06F 21/6218 235/492 |
| 9,779,232 | B1* | 10/2017 | Paczkowski | H04L 63/0838 |
| 9,940,048 | B2 | 4/2018 | Hung et al. | |
| 2002/0010679 | A1* | 1/2002 | Felsher | G06Q 20/3674 705/51 |
| 2002/0048369 | A1* | 4/2002 | Ginter | G07F 9/026 380/277 |
| 2003/0182513 | A1* | 9/2003 | Dodd | G06F 13/28 711/137 |
| 2006/0059368 | A1* | 3/2006 | Fayad | G06F 21/87 713/189 |
| 2006/0204047 | A1* | 9/2006 | Dave | G06F 21/79 382/115 |
| 2008/0010455 | A1* | 1/2008 | Holtzman | H04L 9/3228 713/168 |
| 2008/0040608 | A1* | 2/2008 | Li | G06F 12/1466 713/182 |
| 2010/0064203 | A1* | 3/2010 | Aihara | G06F 11/0727 714/799 |
| 2011/0239004 | A1* | 9/2011 | Hayashi | H04L 9/3263 713/189 |
| 2013/0283353 | A1* | 10/2013 | Ignatchenko | H04L 63/1441 726/4 |
| 2015/0180671 | A1* | 6/2015 | Yamashita | H04L 9/3271 713/168 |
| 2015/0242158 | A1* | 8/2015 | Hung | G06F 3/062 711/103 |
| 2018/0039581 | A1* | 2/2018 | Hung | G06F 12/0246 |
| 2020/0019725 | A1* | 1/2020 | Rule | H04L 63/126 |

OTHER PUBLICATIONS

FIPS PUB 198-1, "The Keyed-Hash Message Authentication Code (HMAC)", Jul. 2008, 13 pages.

Macronix White Paper, "Advanced Sector Protection/UN-Protection," MX29GL128F—Automotive Pages, P/N PM1824, Jan. 30, 2013, pp. 24-29.

NIST Special Publication 800-38C, Dworkin, "Recommendation for Block Cipher Modes of Operation: The CCM Mode for Authentication and Confidentiality," May 2004, 27 pages.

NIST Special Publication 800-38D, Dworkin, "Recommendation for Block Cipher Modes of Operation: Galois/Counter Mode (GCM) and GMAC," Nov. 2007, 39 pages.

NIST Special Publication 800-56A, Revision 2, Barker et al., "Recommendation for Pair-Wise Key Establishment Schemes Using Discrete Logarithm Cryptography," May 2013, 139 pages.

Wikipedia, Elliptic-Curve Diffie-Hellman, downloaded May 8, 2019, 1 page.

Wikipedia, HMAC, downloaded May 8, 2019, 2 pages.

* cited by examiner

SECURITY MEMORY SCHEME

BACKGROUND

Field

The present invention relates to memory security, and particularly to memory security based on message authentication codes.

Description of Related Art

Use of memory devices, including integrated circuit memory devices, is expanding in a variety of settings. Also, communication technologies are becoming more diverse and widespread. These technologies are supporting new types of devices, such as Internet of Things "IoT" devices and the like.

It is desirable to provide a technology for improving information security for data stored on such devices.

SUMMARY

A memory device is described in which the memory space of the device can be divided into a one or more memory zones secured by a message authentication protocol.

An embodiment of a memory device can comprise a memory, and an interface on which to receive a memory command sequence identifying a memory operation and an identified memory zone in the memory. A message authentication code MAC is provided with the command sequence and received at the interface. Control circuits on the device are operatively coupled to the interface, and include a command decoder to decode a received a command sequence and to execute the identified memory operation. A message authentication engine is operatively coupled to the control circuits and the interface, including logic to compute a value of a message authentication code to be matched with the received message authentication code using all or part of the received command sequence and a message authentication parameter stored on the device. The device can include a message authentication parameter store storing a plurality of message authentication parameters, such as cryptographic keys, associated with one or more memory zones in the memory. The message authentication parameter to be used to compute the value to be matched with the received message authentication code can be identified by an address in the received memory command sequence. The message authentication engine can include logic to prevent completion of the memory operation identified by the command sequence if the value computed does not match the received message authentication code.

In an example described herein, the memory device includes logic to control states of authentication flags for corresponding zones in the plurality of zones in the memory. The authentication flags are set based on matching the computed value of the message authentication code with the received message authentication code. The logic enables or disables completion of the identified memory operation in response to the state of the authentication flag corresponding to the identified zone.

The memory and message authentication engine can be disposed on separate integrated circuit chips, or on a single integrated circuit chip. In some embodiments, the memory and message authentication engine can be disposed on separate integrated circuit chips connected by a physically secure link. In some embodiments, the memory and message authentication engine can be disposed on separate integrated circuit chips in a multichip package.

Message authentication protocols utilized in technology described herein can use all or part of the command sequence to compute the message authentication code. The command sequence can comprise an operation code for the command, addresses, a nonce, header data, and other elements, and for write operations, the data to be written. The authenticity and integrity of all or part of the command sequence can be secured by the message authentication protocol.

Complementary logic on the host which produces the command sequence uses a shared message authentication parameter, or cryptographic key, along with the command sequence being generated, to produce the message authentication code provided with a command sequence.

In general, a method is described for operating a memory device that includes storing a message authentication parameter associated with a memory zone on the memory device; receiving a command sequence identifying a memory operation and said memory zone, along with a message authentication code for the command sequence; computing a value for the message authentication code using all or part of the command sequence and the message authentication parameter associated with the memory zone; and preventing completion of the memory operation identified by the command sequence if the value computed does not match the received message authentication code.

Other aspects and advantages of the technology described herein can be seen on review of the drawings, the detailed description and the claims, which follow.

DETAILED DESCRIPTION

A detailed description of embodiments of the present invention is provided with reference to the FIGS. 1-5.

Figure 1:
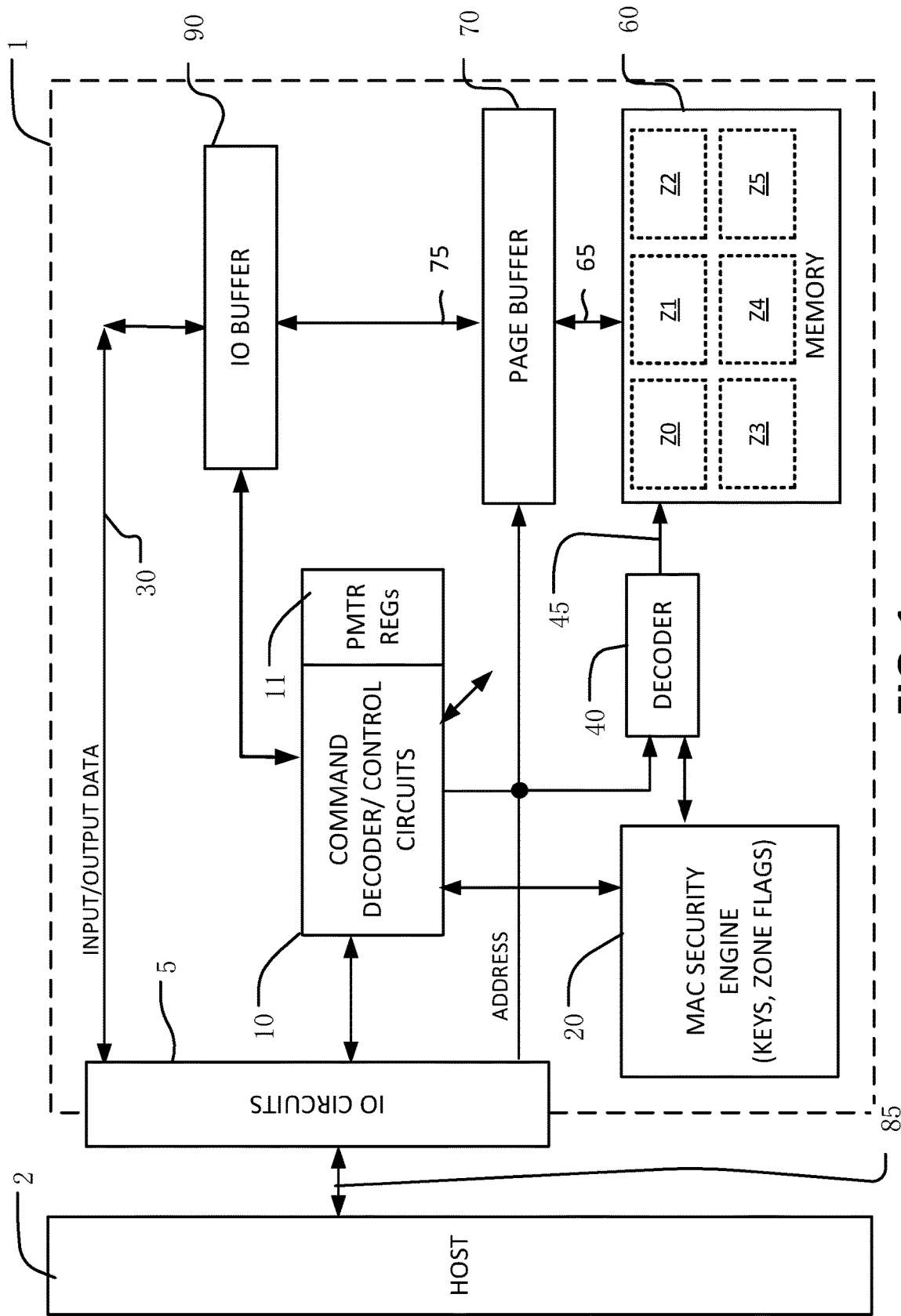
FIG. 1 is a simplified diagram of a host and an integrated circuit memory including a message authentication code security engine as described herein.

FIG. 1 is a simplified diagram of a memory system including a memory device 1 and a host 2 configured for accessing the memory device 1. The host 2 and memory device 1 include complementary logic for utilizing message authentication codes in communications with the memory device, usable to authenticate command sequences received at the memory device 1 via communication link 85.

Communication link 85 between the host 2 and the memory device can comprise a network or bus system including interface circuits on the host 2 and memory device 1, such as a serial peripheral interface SPI bus, a peripheral component interconnect express PCIE bus, an Ethernet connection, or other system compatible with the host and memory device. Also, the link 85 can be a wireless link, supported by radio circuitry on or accessible by the host 2 and the memory device 1. The link in some embodiments, can comprise point to point connection protocols. The link can in some embodiments, support packet switched protocols, such as interne protocols. Also, the link in some embodiments, can support circuit switched protocols.

The host 2 can comprise a general purpose processor, a special purpose processor, a processor configured as a memory controller, or other processor that uses or controls the memory device 1. The memory device 1 and host 2 may be implemented on a single circuit board. In other embodiments, the host 2 can be a physical or virtual remote server, a cloud-based platform or a server connected via a local area network to the memory device 1. A variety of host configurations can be used. The host 2 includes security logic and processor resources supporting a message authentication protocol with the memory device 1, and in particular a source side portion of the message authentication protocol. In some embodiments, the host 2 can include resources supporting a receiver side portion of the message authentication protocol, to process communications from the memory device 1.

The memory device 1 includes memory, including a memory array 60 in this example. A decoder 40 is coupled to a plurality of access lines 45 (such as word lines, block select lines and string select lines and so on), and arranged along rows in the memory array 60. A page buffer 70 is coupled to a plurality of access lines 65 (such as bit lines) in the memory array 60 for reading data from and writing data to the memory array 60

Input/Output 10 circuits 5 on which to receive a memory command sequence identifying a memory operation and an identified memory zone in the memory, and a message authentication code for the command sequence, are connected to the link 85. The IO circuits 5 supply addresses to address lines 30, to control circuits 10 implementing a command decoder and controller modules, to page puffer 70 and to decoder 40.

The page buffer 70 can include circuits for selectively applying program and inhibit voltages to bit lines in the memory in response to the data values and control signals that set the memory access operation to be executed. Also, the page buffer 70 can include sensing circuits for reading data from the array.

Data is moved to and from the page buffer 70 via data lines 75 and IO buffer 90, which in turn is coupled to IO circuits 5 via a data path 30.

In the example shown in FIG. 1, control circuits 10 include control modules implementing a bias arrangement state machine, or machines, which controls, or control, the application of supply voltages generated or provided through the voltage supply or supplies on the device, such as read, verify and program voltages for a set of selectable program, erase and read operations.

The control circuits 10 are coupled to the IO buffer 90 and the memory array 60 and other elements of the integrated circuit as needed. The control modules in the control circuits 10 include logic to control memory operations.

The control circuits 10 can include modules implemented using special-purpose logic circuitry as known in the art. In alternative embodiments, the control circuits 10 can include modules implemented using a general-purpose processor, which can be implemented on the same integrated circuit, which executes a computer program to control operations of the memory device 1. In yet other embodiments, a combination of special-purpose logic circuitry and a general-purpose processor can be utilized for implementation of modules in control circuits 10.

In the illustrated embodiment, a set 11 of parameter registers is included on the memory device 1, and coupled to control modules in the circuits 10. The parameter registers in the set 11 can store parameters for a plurality of program operations, erase operations and read operations, which are executed in response to command sequences received via link 85 from host 2. For example, the parameter registers can store program verify voltage levels and read voltage levels used in different program and read operations. Also, the parameter registers can store details of program sequences, such as pulse height, pulse width, and pulse magnitude increments, used in programming algorithms such as incremental stepped pulse programming ISPP algorithms.

The memory array 60 can comprise floating gate memory cells or dielectric charge trapping memory cells configured a NAND flash memory, implemented using two-dimensional or three-dimensional array technology. In other examples, the memory array can be configured as NOR flash memory, or AND flash memory. The memory array can comprise other types of memory, including read only memory, write-once memory, SRAM, and DRAM. The memory cells may comprise programmable resistance memory cells, such as phase change memory and ReRAM memory based on for example metal oxide memory material. Other types of memory cells and memory architectures can be used as well.

The memory in memory device 1 includes a memory array 60 including multiple memory zones Z0 to Z5 in this example, although there can be any number. The zones comprise respective parts of the address space in the array 60, accesses to which can be identified by an address within the respective parts of the address space. The zones can have any practical size. The zones can have boundaries corresponding to physical partitions of the array 60, such as erase block boundaries in flash memory, sector boundaries corresponding to divisible layout regions in the array, planes in the array, banks in the array or other types of partitions. Also the zones can have boundaries corresponding to logical partitions of the array 60, specified for example only by ranges of addresses unconstrained by physical partitions.

The memory device 1 includes a MAC security engine 20 operatively coupled to the control circuits 10, can include a message authentication parameter store for one or more message authentication parameters associated with one or more memory zones in the memory, logic to compute a value to be matched with a received message authentication code using a received command sequence and message authentication parameter in the message authentication parameter store associated with the identified memory zone, and to prevent completion of the memory operation identified by the command sequence if the value computed does not match the received message authentication code. The MAC security engine 20 supports use of message authentication codes for the purposes of access to the memory array 60. The MAC security engine 20 can store unique message authentication parameters, such as MAC keys, for each of a plurality of individual zones in the plurality of zones. In some embodiments, more than one zone in the plurality of zones can share message authentication parameters, in effect increasing the size of the address range accessible using a single MAC key. The MAC security engine 20 can include registers, buffers and other memory resources used as stores for parameters, including keys and flags, and working memory supporting the computation of values for message authentication codes MACs. The MAC security engine 20 can be implemented using logic circuits, logic implemented by software using a general purpose processor, and combinations of logic circuit and processors. The logic can comprise state machines configured according to standardized MAC protocols and according to other types of MAC protocols. The MAC security engine 20 can be operatively coupled to the control circuits 10, or directly to the IO circuits 5, to receive incoming command sequences and MACs. Also, the MAC security engine 20 can be operatively coupled, directly or via control circuits 10, to components of the memory device for the purposes of enabling memory operations, preventing completion of memory operations and overriding memory operations based on results of message authentication protocols.

A MAC can be used to authenticate one or both the source of a command sequence and its integrity. One type is known as a keyed-hash based message authentication code HMAC. HMACs can have two functionally distinct parameters, a message input (in this case part of all of a command sequence for example) and a secret key known only to the message source and intended receiver(s). An HMAC function is used by the message source produce a value (the MAC) that is formed by condensing the secret key and the message input. The MAC is typically sent to the message receiver along with the message. The receiver computes the MAC on the received message using the same key and HMAC function as were used by the sender, and compares the result computed with the received MAC. If the two values match, the message has been correctly received, and the receiver is assured that the sender is a member of the community of users that share the key. See, FIPS PUB 198-1, "The Keyed-Hash Message Authentication Code (HMAC)", July 2008, which is incorporated by reference as if fully set forth herein.

Another cryptographic mechanism usable for generation of MACs comprises an adaptation of a cipher block chaining (CBC) technique to provide assurance of authenticity. Specifically, the CBC technique with an initialization vector of zero is applied to the data to be authenticated (e.g. the command sequence); the final block of the resulting CBC output, possibly truncated, serves as a message authentication code (MAC) of the data. One algorithm for generating a MAC in this fashion is commonly called CBC-MAC.

An algorithm called Counter with Cipher Block Chaining-Message Authentication Code, abbreviated as CCM can provide assurance of confidentiality and authenticity of command sequences. See, NIST Special Publication 800-38C, "Recommendation for Block Cipher Modes of Operation: The CCM Mode for Authentication and Confidentiality," May 2004, which is incorporated by reference as if fully set forth herein.

Another algorithm called Galois/Counter Mode (GCM) can be used for authenticated encryption with associated data. GCM is constructed from an approved symmetric key block cipher, such as the Advanced Encryption Standard (AES) algorithm that is specified in Federal Information Processing Standard (FIPS) Pub. 197. Thus, GCM is a mode of operation of the AES algorithm.

GCM provides assurance of the confidentiality of data using a variation of a Counter mode of operation for encryption. GCM provides assurance of the authenticity of large files of confidential data (for example up to about 64 gigabytes per invocation) using a universal hash function that is defined over a binary Galois (i.e., finite) field. GCM can also provide authentication assurance for additional data (of practically unlimited length per invocation) that is not encrypted.

If the GCM input is restricted to data that is not to be encrypted, the resulting specialization of GCM, called GMAC, is simply an authentication mode on the input data. See, NIST Special Publication 800-38D, "Recommendation for Block Cipher Modes of Operation: Galois/Counter Mode (GCM) and GMAC," November 2007, which is incorporated by reference as if fully set forth herein.

Message authentication protocols that require a shared private key depend for security on protection and management of the shared keys. A variety of techniques can be used for this purpose. See, NIST Special Publication 800-56A, Revision 2, "Recommendation for Pair-Wise Key Establishment Schemes Using Discrete Logarithm Cryptography," May 2013, which is incorporated by reference as if fully set forth herein.

Figure 2:
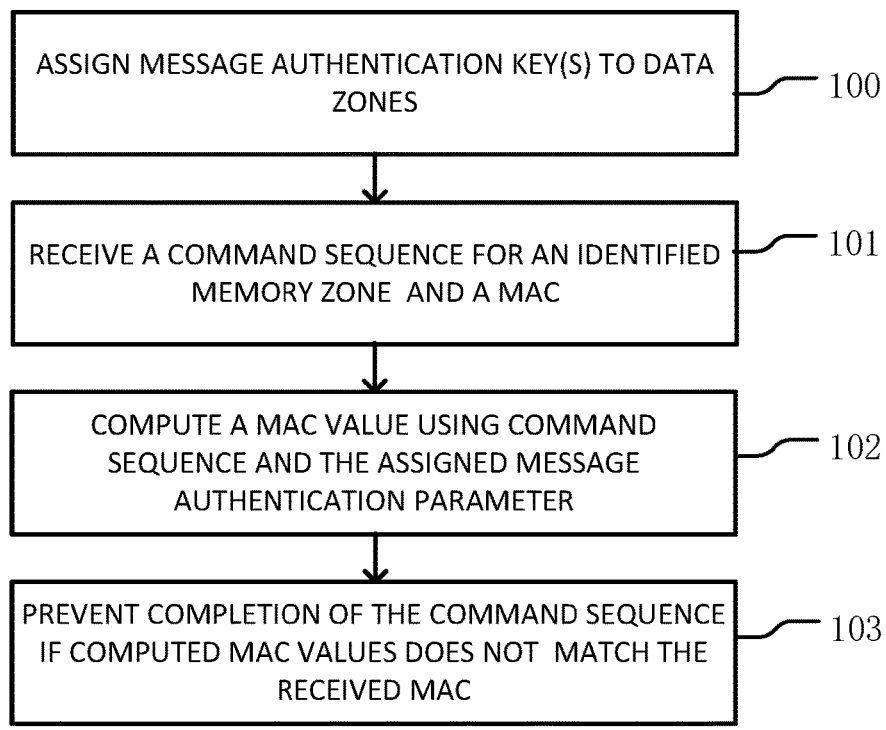
FIG. 2 is a simplified diagram of a method of operating a memory device such as that shown in FIG. 1 utilizing message authentication codes.

In general, a method for operating a memory device is described supported by logic and computation resources in the control circuits 10 and the MAC security engine 20 with reference to FIG. 2. The method can include storing on the memory device, a set of message authentication parameters, such as a MAC keys, assigned to each memory zone in a plurality of memory zones. The message authentication parameters stored on the memory device can be associated by addresses used in command sequences, with corresponding memory zones that are identified by address ranges (100). For example, an address used to access a memory zone can identify the corresponding assigned message authentication parameter.

The memory device can receive a command sequence for an identified memory zone and a message authentication code MAC from the host (101). In support of the message authentication protocol, the command sequence can comprise a memory device read or write command which can consist of assertion of a chip enable control signal followed by an operation code including sequence of bytes on address and/or data lines which identify a memory operation to be executed, an address associated with the memory operation which can also identify the memory zone, and data in the case of a write operation. Also, the command sequence can be supplemented using additional elements, such as a nonce, parameters such as a length of associated data, initialization values, plaintext strings used as packet headers, and so on.

Upon receipt of the command sequence, or while receiving the command sequence, a MAC value is computed using a vector derived from all or part of the command sequence and using the message authentication parameter associated with the identified zone stored on the memory device (102).

The memory device can initiate execution of a memory operation identified in the command sequence, and compute the MAC value in parallel, so that the latency involved in each of the operations overlaps in time. For example, the control circuits 10 can begin the memory operation identified by the command sequence before completion of computing the MAC value. If the MAC does not match, then the control circuits disable completion of the memory operation after beginning its execution. In other examples, initiation of the memory operation on the memory device can be delayed or placed in an idle state, until confirmation of the MAC code, and its completion can be prevented by preventing initiation of the operation.

The method includes preventing completion of the memory operation identified by the command sequence if the value computed on the memory device does not match the received MAC (103).

In cases in which the command sequence includes a read command to the identified zone, the control circuits can prevent completion of the memory operation by outputting false data, such as all zeros, or all ones. Also, in the case of a read command, the control circuits can prevent completion of the memory operation by disabling the output drivers by for example setting a high impedance tri-state on outputs.

In cases in which the command sequence includes a write command to the identified zone, the control circuits can come prevent completion of the memory operation by aborting the write operation before altering data in the identified zone.

Figure 3:
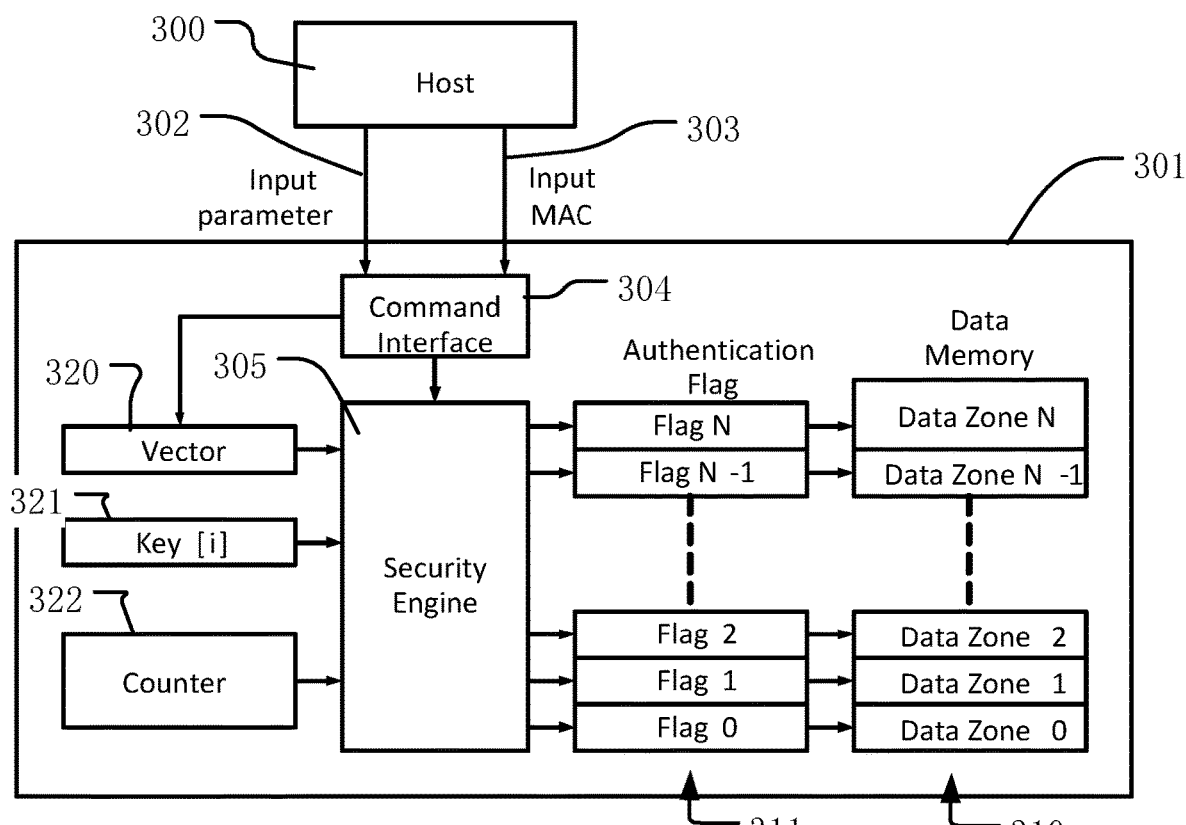
FIG. 3 is a simplified block diagram of a system including a host and a memory device supported by a security engine as described herein.

FIG. 3 is a simplified diagram of a system including a host 300 and a memory device 301, including an embodiment of a MAC security engine 305 in the memory device 301.

The memory device includes a plurality of data zones in the data memory 310. The data zones can comprise equal sized portions of the memory space in the data memory 310. In some embodiments, the data zones can have different sizes. In some embodiments, all of the data memory 310 can be allocated to the data zones protected by the MAC protocol. In other embodiments, only parts of the data memory 310 may be allocated to zones protected by the MAC protocol.

The communication link between the host 300 and memory device 301 is used to deliver input parameters (302) of a command sequence along with an input MAC (303). A command interface 304 is included on the device 301 on which to receive the input parameters (302) of a memory command sequence identifying a memory operation and an identified memory zone in the memory, and MAC (303) for the command sequence. The command interface routes a vector from the input parameters 302 to a vector store 320, and to the security engine 305.

The security engine 305 is coupled to a key store 321, which associates keys with data zones in the data memory 310. Also, security engine 305 can be connected with a counter 322, which is utilized in some implementations of methods authentication protocols.

In the illustrated embodiment, the key store 321 stores a set of keys, which can be a cryptographic key shared with the host in a secure way. The set of keys includes individual key[i], for i going from 0 to N, where the number of zones in the memory 310 is equal to N+1, each key [i] being associated with a corresponding zone in the plurality of zones. In some embodiments, more than one zone can share a common key[i]. In some embodiments, a single key may be used for all the zones. In some embodiments, each key in the plurality of keys is mapped by logic, such as configurable lookup tables, to one or more corresponding zones in the plurality of memory zones. Thereby, the amount of memory space (i.e. one or more zones, and zones of different sizes) assigned to each key can be configured as suits a particular setting. The key store 321 and the mapping tables can comprise volatile or nonvolatile memory.

In some embodiments, the address ranges associated with one or more of the zones in the memory 310 can be configured using parameters stored on the memory device, such a starting address and extent parameters, or starting and ending addresses. In other embodiments, the zone boundaries can be set in manufacturing.

In the embodiment illustrated in FIG. 3, the device 301 includes a volatile or nonvolatile store 311 storing authentication flags, Flag 0 to Flag N, one for each data zone in the data memory 310. In general, the security engine 305 can cooperate with the control circuitry on the memory device by testing the input MAC against a computed MAC value for a given command sequence, and upon a match setting the flag or flags for the corresponding data zone or zones subject of the command sequence. Prior to completion of the memory operation identified by the command sequence, the control circuits can test the flags. If the corresponding flag or flags is/are not set prior to completion of the memory operation, then its completion is prevented as discussed above.

Figure 4:
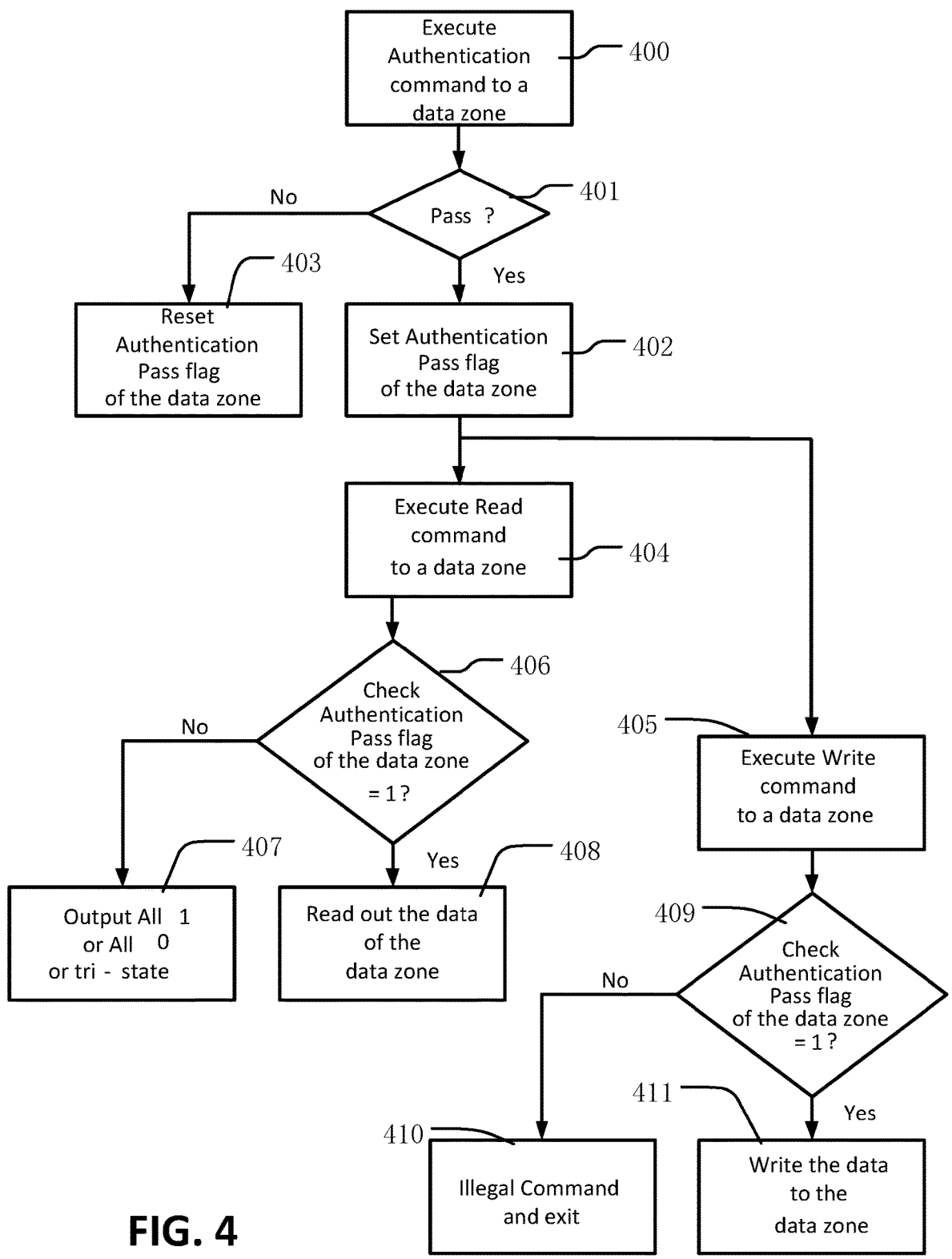
FIG. 4 is a simplified diagram of a method of operating a device like that of FIG. 3.

FIG. 4 is a flowchart of a control sequence which can be executed by a system like that of FIG. 3. The sequence includes executing an authentication protected command sequence for an identified data zone, including computing a MAC value (400). The computed MAC value is compared to the received MAC value to determine whether the authentication protocol is passed (401). If the computed value matches the received value, then the authentication pass flag for the identified data zone is set (402). If the computed value does not match, then the authentication pass flag for the identified data zone is reset (403). Thereafter, or overlapping in time with the computation of the MAC value, the identified operation is executed as shown in the diagram by branches to executing a read command to the data zone (404), or executing a write command to the data zone (405). Before completion of the read operation, the authentication pass flag is checked for the corresponding data zone (406). If the pass flag is not set, then completion of the read command is prevented by outputting all one's or zeros, or tri-stating the output drivers (407). If the pass flag is set, then the read data is output via the I/O circuits on the device (408).

Before completion of a write operation, the authentication pass flag is checked for the corresponding data zone (409). If the pass flag is not set, then completion of the write command is prevented by aborting the write operation before altering data in the identified zone, and optionally outputting an illegal command notification (410). If the pass flag is set at step 409, then the write data operation is completed to the data zone (411).

Figure 5:
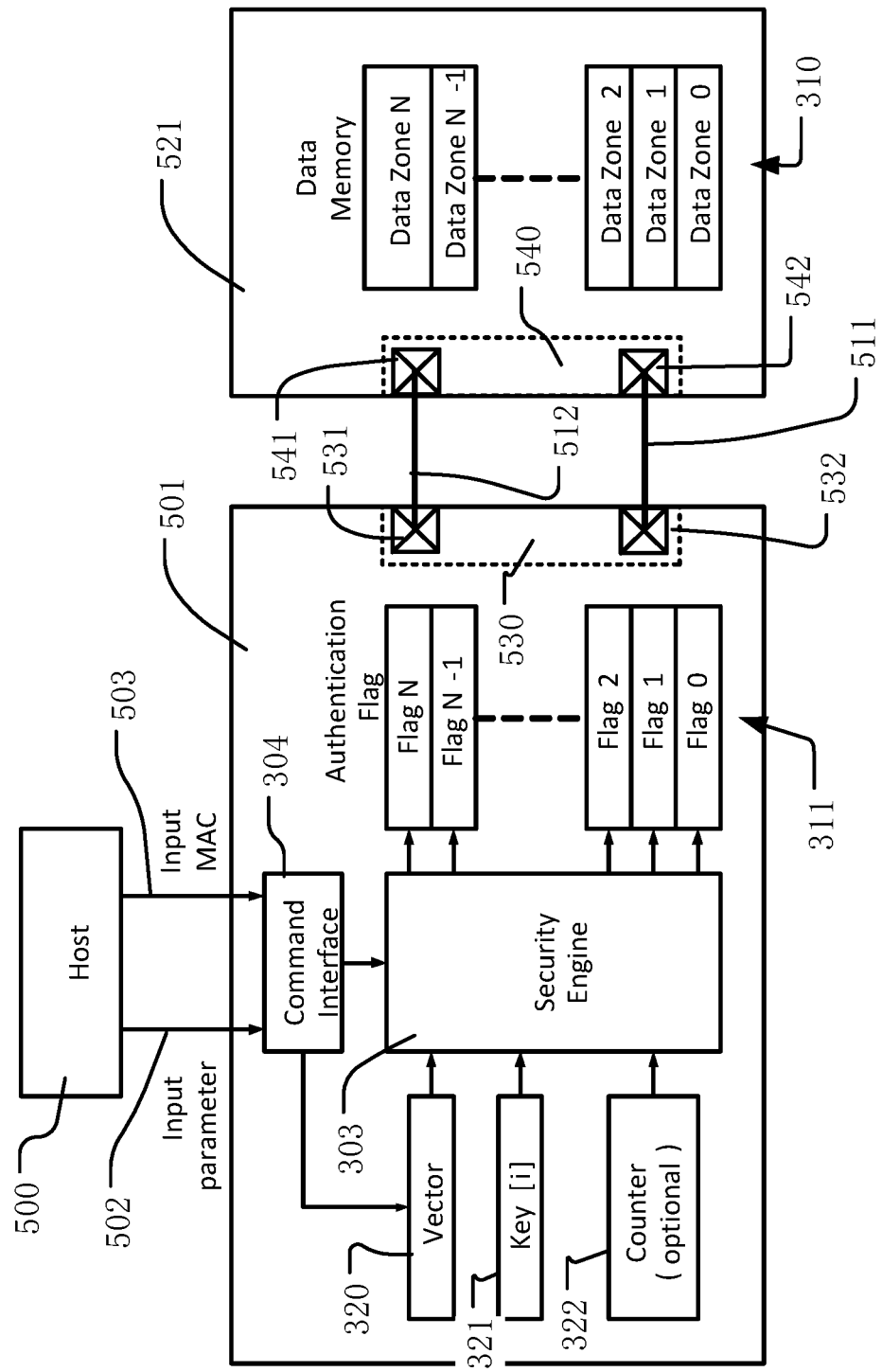
FIG. 5 is a simplified block diagram of a system including a host coupled to a multichip package, including a security chip and a memory chip configured for execution of message authentication protocols.

FIG. 5 illustrates an embodiment including a multi-chip package, the package including a security chip 501 and a memory chip 521, which communicate input parameters (502) of a command sequence along with an input MAC (503). In this embodiment, the memory and the message authentication engine are disposed on separate integrated circuit chips. Security chip 501 and the memory chip 521 can be connected by control and IO links 511, 512 between connection pads 531-541, 532-542, with interconnection routing and receiver and transmitter circuits 530, 540 as necessary for a given configuration, on the respective chips. The links 511, 512 can be physically secure links inside protective packaging or otherwise safe from external access. For example, in a stacked chip embodiment, the connection pads 531-541, 532-542 can comprise a ball grid array, or through silicon vias.

Security chip 501 can also include memory controller logic, or other functionality. In the illustrated embodiment, the security chip 501 comprises elements like those in FIG. 3, which are given the same reference numbers and not described again. The memory chip 521 is not directly coupled to the host 500. The memory chip 521 can comprise a large-scale NAND flash device, or other type of large-scale memory device such as DRAM or SRAM and others, including a plurality of data zones, zone 0 to zone N as discussed above. In some embodiments, a plurality of memory devices can be stacked, commonly coupled to the security chip 501, where the data zones subject of the message authentication protocol can be located on one or more of the memory devices in the stack.

A memory chip is described herein that includes a security engine. The data memory can be divided into multiple data zones, and each data zone can have a flag that must be set to permit command access. Each flag can be set and reset in response to an authentication scheme, such as a message authentication scheme. The authentication scheme can include an authentication engine, a key, a vector, and a counter value in some embodiments.

A security chip and a memory chip, or a plurality of memory chips, can be packaged in a multi-chip package. The security chip can include the security engine. The memory chip can be divided into multiple data zones, each with an authentication flag permit access by particular commands according to a message authentication scheme.

A number of flowcharts illustrating logic executed by memory device are described herein. The logic can be implemented using processors programmed using computer programs stored in memory accessible to the computer systems and executable by the processors, by dedicated logic hardware, including field programmable integrated circuits, and by combinations of dedicated logic hardware and computer programs. With all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A memory device, comprising:
memory;
an interface on which to receive a memory command sequence identifying a memory operation and an identified memory zone in the memory, and a message authentication code for the memory command sequence;
control circuits operatively coupled to the interface, including a command decoder to decode the received memory command sequence, and to execute the identified memory operation; and
a message authentication engine operatively coupled to the control circuits, including logic to
compute a value to be matched with the received message authentication code using all or part of the received memory command sequence and a stored message authentication parameter associated with the identified memory zone,
prevent completion of the memory operation identified by the memory command sequence if the value computed does not match the received message authentication code, and
control states of authentication flags for corresponding memory zones in a plurality of memory zones, based on matching the computed value with the received message authentication code, and to enable or disable completion of the identified memory operation in response to the state of the authentication flag corresponding to the identified memory zone.

2. The memory device of claim 1, further including a message authentication parameter store for a plurality of message authentication parameters associated with one or more memory zones in the memory.

3. The memory device of claim 2, wherein the plurality of message authentication parameters comprise cryptographic keys, each key being mapped to one or more corresponding zones in the plurality of memory zones.

4. The memory device of claim 1, wherein the memory and message authentication engine are disposed on separate integrated circuit chips.

5. The memory device of claim 1, wherein the memory and message authentication engine are disposed on separate integrated circuit chips connected by a physically secure link.

6. The memory device of claim 1, the message authentication engine including the logic to
determine whether the computed value matches the received message authentication code;
set the authentication flag corresponding to the identified memory zone if the computed value matches the received message authentication code; and
prevent completion of the memory operation if the zone flag is not set for the identified zone.

7. The memory device of claim 1, wherein the message authentication parameter is a cryptographic key.

8. The memory device of claim 1, wherein the memory command sequence comprises an operation code for the memory command sequence, and a nonce, and wherein said all or part of the memory command sequence includes the nonce.

9. A method for operating a memory device, comprising:
storing a message authentication parameter associated with a memory zone of a plurality of memory zones;
receiving a command sequence identifying a memory operation and said memory zone, and a message authentication code for the command sequence;
computing a value for the message authentication code using all or part of the command sequence and the message authentication parameter associated with said memory zone;
determining whether the computed value matches the received message authentication code;
performing one of
(A) if the computed value matches the received message authentication code, setting a zone flag corresponding to said memory zone and completing the memory operation; or
(B) if the computed value does not match the received message authentication code, refraining from setting the zone flag corresponding to said memory zone and preventing completion of the memory operation identified by the command sequence.

10. The method of claim 9, said preventing completion of the memory operation including beginning execution of the memory operation before completion of computing the value, and disabling completion of the memory operation if the value computed does not match the received message authentication code.

11. The method of claim 9, wherein the command sequence comprises a read command to the identified zone, and preventing completion of the memory operation comprises outputting false data.

12. The method of claim 9, wherein the command sequence comprises a read command to the identified zone, and preventing completion of the memory operation comprises disabling output drivers.

13. The method of claim 9, wherein the command sequence comprises a write command to said memory zone, and preventing completion of the memory operation comprises aborting the write operation before altering data in said memory zone.

14. The method of claim 9, wherein the message authentication parameter is a cryptographic key.

15. The method of claim 9, wherein the command sequence comprises an operation code for the command, and a nonce, and wherein said all or part of the command sequence includes the nonce.

16. The method of claim 9, said storing including storing a plurality of message authentication parameters, each message authentication parameters in the plurality being mapped to one or more corresponding zones in the plurality of memory zones.

17. The memory device of claim 1, wherein the memory command sequence is a first memory command sequence, the memory operation is a first memory operation, the identified memory zone is a first memory zone in the memory, and the message authentication code is a first message authentication code, the value is a first value, the message authentication parameter is a first message authentication parameter, and wherein:
the interface is to receive a second memory command sequence identifying a second memory operation and an identified second memory zone in the memory, and a second message authentication code for the second memory command sequence;
the message authentication engine including the logic to compute a second value to be matched with the received second message authentication code using all or part of the received second memory command sequence and a stored second message authentication parameter associated with the identified second memory zone.

18. The memory device of claim 1, wherein:
the memory includes at least a first memory zone and a second memory zone;
the stored message authentication parameter is a first message authentication parameter associated with the first memory zone; and
a second message authentication parameter is associated with the second memory zone, wherein the second message authentication parameter is different from the first message authentication parameter.

19. A method for operating a memory device, comprising:
storing a plurality of message authentication parameters, each message authentication parameter of the plurality of message authentication parameters associated with corresponding one or more memory zones of a plurality of memory zones of the memory device;
storing a plurality of authentication flags, each authentication flag of the plurality of authentication flags associated with a corresponding memory zone of the plurality of memory zones;
receiving a command sequence identifying (i) a memory operation and (ii) a first memory zone of the plurality of memory zones;
aiming to authenticate the command sequence, at least in part using a stored first message authentication parameter of the plurality of message authentication parameters, the first message authentication parameter associated with the first memory zone;
in response to successful authentication of the command sequence, setting a first authentication flag of the plurality of authentication flags, the first authentication flag associated with the first memory zone; and
in response to setting the first authentication flag, completing execution of the memory operation.

20. The method of claim 19, further comprising:
receiving another command sequence identifying (i) another memory operation and (ii) a second memory zone of the plurality of memory zones;
aiming to authenticate the other command sequence, at least in part using a stored second message authentication parameter of the plurality of message authentication parameters, the second message authentication parameter associated with the second memory zone;
in response to a failure to authenticate the other command sequence, refraining from setting a second authentication flag of the plurality of authentication flags, the second authentication flag associated with the second memory zone; and
in response to refraining from setting the second authentication flag, refraining from completing execution of the other memory operation.

* * * * *